(12) United States Patent
Kamiya

(10) Patent No.: US 8,325,975 B2
(45) Date of Patent: Dec. 4, 2012

(54) IMAGE PROCESSING APPARATUS AND SCRIPT CORRECTION METHOD THEREFOR

(75) Inventor: Yuka Kamiya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 12/900,384

(22) Filed: Oct. 7, 2010

(65) Prior Publication Data

US 2011/0091134 A1  Apr. 21, 2011

(30) Foreign Application Priority Data

Oct. 16, 2009  (JP) ................................. 2009-239401

(51) Int. Cl.
*G06K 9/00* (2006.01)
*H04N 1/387* (2006.01)
(52) U.S. Cl. .......................... 382/100; 358/452; 358/453
(58) Field of Classification Search .................. 382/100, 382/274, 275, 309, 310; 358/452, 453, 537; 399/182; 714/701, 746, 751, 753
See application file for complete search history.

(56) References Cited

U.S. PATENT DOCUMENTS

| 8,107,755 B2 * | 1/2012 | Hosaka et al. ................. 382/251 |
| 2005/0146755 A1 * | 7/2005 | Shimokawa et al. .......... 358/453 |

FOREIGN PATENT DOCUMENTS

JP  2005-278143 A  10/2005

* cited by examiner

*Primary Examiner* — Abolfazl Tabatabai
(74) *Attorney, Agent, or Firm* — Canon USA, Inc., I.P. Division

(57) ABSTRACT

An image processing apparatus capable of processing an image based on a script indicating an execution content of a job includes an execution unit configured to process the script, a classification unit configured to classify the script processed by the execution unit into a plurality of types including an executable type or an inexecutable type by the execution unit, a correction unit configured to correct a content of the script, a notification unit configured to notify a user of the image processing apparatus of the inexecutable type script by the execution unit, and a determination unit configured, when the classification unit classifies the script as the inexecutable type script, to determine when to (a) perform notification by the notification unit or to (b) cause the correction unit to correct the content of the script without notification by the notification unit and to process the corrected script by the execution unit based on the content of the script and a function included in the image processing apparatus.

6 Claims, 10 Drawing Sheets

FIG. 6

```
<Function id="JOB TYPE" no="EXECUTION SEQUENCE">
  <Element id="FUNCTION NAME">
    <Item id="SETTING ITEM NAME">SETTING VALUE</Item>
    <Item id="SETTING ITEM NAME">SETTING VALUE</Item>
  </Element>
  <Element id="JOB TYPE">
    <Item id="SETTING ITEM NAME">SETTING VALUE</Item>
  </Element>
</Function>
<Function id="JOB TYPE" no="EXECUTION SEQUENCE">    ~601
  <Element id="FUNCTION NAME">   ~602
    <Item id="SETTING ITEM NAME">SETTING VALUE</Item>
  </Element>
</Function>            603                    604
```

IMAGE PROCESSING APPARATUS AND SCRIPT CORRECTION METHOD THEREFOR

BACKGROUND OF THE INVENTION

1. Field of the Invention

The present invention relates to an image processing apparatus capable of executing a script.

2. Description of the Related Art

In recent years, a multifunction peripheral has been employed to execute a script that defines an execution content of a job beforehand. Defining setting contents of jobs in scripts in advance and registering the scripts in the multifunction peripheral enable a user to execute a job only by selecting a script on an operation panel without any complex setting.

The multifunction peripheral can import and execute a script generated outside the multifunction peripheral such as another multifunction peripheral or an information processing apparatus. In this case, there may be defined processing inexecutable by the multifunction peripheral that executes the imported script. Thus, a technique has been developed, which allows an information processing apparatus that has generated a script to automatically select a multifunction peripheral capable of executing a job based on the script (as discussed in Japanese Patent Application Laid-Open No. 2005-278143).

In the conventional technology, however, no multifunction peripheral capable of executing the job may be found. In such a case, a client terminal needs to correct the script while considering a capability of a multifunction peripheral. This results in lack of convenience.

Even when the script can be corrected by the multifunction peripheral, the multifunction peripheral does not have to always execute the job strictly based on the script. Conventionally, however, consideration has only been given to user's notification of the correction whenever there is a need to correct the script by the multifunction peripheral. No consideration has been given to prevention of useless notification.

SUMMARY OF THE INVENTION

According to an aspect of the present invention, an image processing apparatus capable of processing an image based on a script indicating an execution content of a job includes an execution unit configured to process the script, a classification unit configured to classify the script processed by the execution unit into a plurality of types including an executable type or an inexecutable type by the execution unit, a correction unit configured to correct a content of the script, a notification unit configured to notify a user of the image processing apparatus of the inexecutable type script by the execution unit, and a determination unit configured, when the classification unit classifies the script as the inexecutable type script, to determine when to (a) perform notification by the notification unit or to (b) cause the correction unit to correct the content of the script without notification by the notification unit and to process the corrected script by the execution unit based on the content of the script and a function included in the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a script according to the exemplary embodiment.

DETAILED DESCRIPTION OF THE EMBODIMENTS

Various exemplary embodiments, features, and aspects of the invention will be described in detail below with reference to the drawings.

Figure 1:
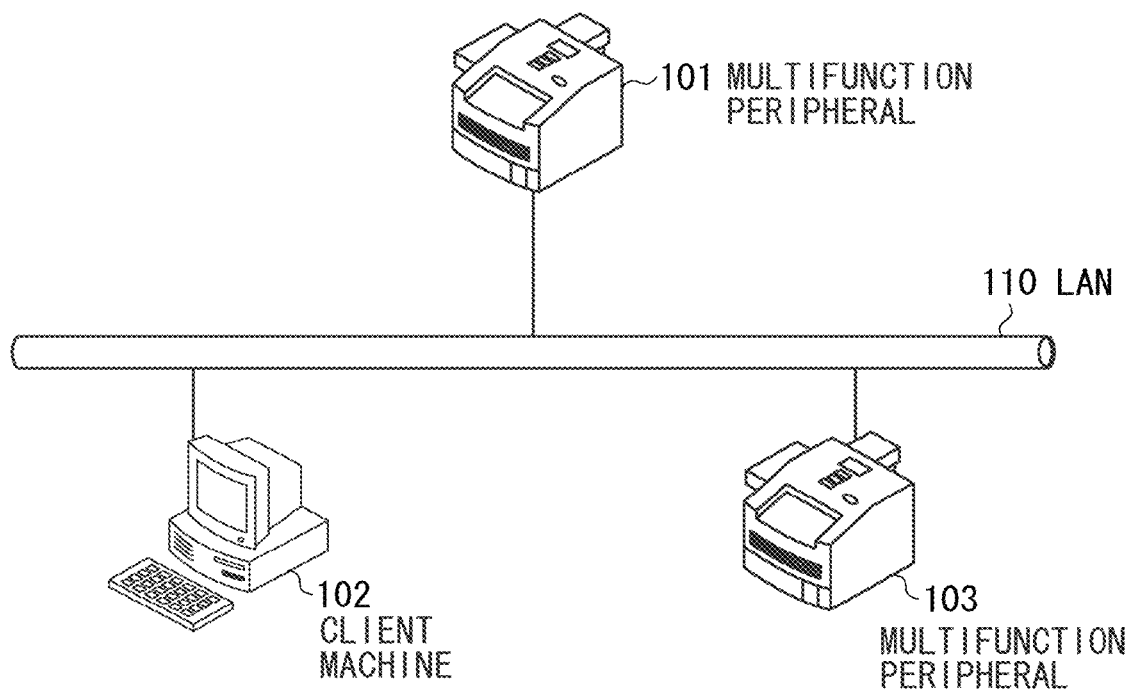
FIG. 1 illustrates an example of a system configuration that includes an image processing apparatus according to an exemplary embodiment of the present invention.

FIG. 1 illustrates an example of a system configuration that includes an image processing apparatus according to an exemplary embodiment of the present invention.

A multifunction peripheral 101 that is an example of an image processing apparatus according to the present exemplary embodiment can be connected to a local area network (LAN) 110 together with a client machine 102 (e.g. personal computer) and a multifunction peripheral 103 to be communicable with each other. Each of the multifunction peripherals 101 and 103 includes a plurality of types of functions such as copying, printing, scanning, facsimile transmission/reception, and image transmission/reception via a network. Each of the multifunction peripherals 101 and 103 includes a storage (storage device) such as a hard disk (HDD), and can store various scripts in the storage.

A script describes an execution content of one or a plurality of jobs to be executed by each of the multifunction peripherals 101 and 103. As scripts, for example, there are a script that defines a box scan job for scanning a document to store it in the storage, a box print job for printing a document stored beforehand in the storage, a transmission job, or a copying job, and a script constructed as a work flow by combining the plurality of jobs.

These scripts are generated by the multifunction peripheral 101, and stored in the storage included in the multifunction peripheral 101. The scripts generated by the multifunction peripheral 101 can be stored in the storage of the multifunction peripheral 103 via the LAN 110. The multifunction peripheral 103 can also generate scripts. Hereinafter, unless otherwise specified, description of the multifunction peripheral 101 applies to the multifunction peripheral 103.

The client machine 102 that is an example of an information processing apparatus has a function of generating scripts. The multifunction peripherals 101 and 103 can import the scripts generated by the client machine 102 to store the scripts in the storage or execute them.

Each of the multifunction peripherals 101 and 103 calls an appropriate script from the storage to execute (process) the script in response to an execution request received by its operation unit.

In the present exemplary embodiment, the scripts are stored in the storages included in the multifunction peripherals 101 and 103. However, other configurations can be employed. For example, a configuration can be employed where a server apparatus for storing the scripts is connected to the LAN 110 and the scripts generated by the multifunction peripheral 101 or the client machine 102 are unitarily managed by the server apparatus.

In the present exemplary embodiment, the script is called from the storage included in each of the multifunction peripherals 101 and 103 to be executed/processed. However, other configurations can be employed. For example, a configuration can be employed where the script stored in the client machine 102 or the server apparatus is called to be executed.

Figure 2:
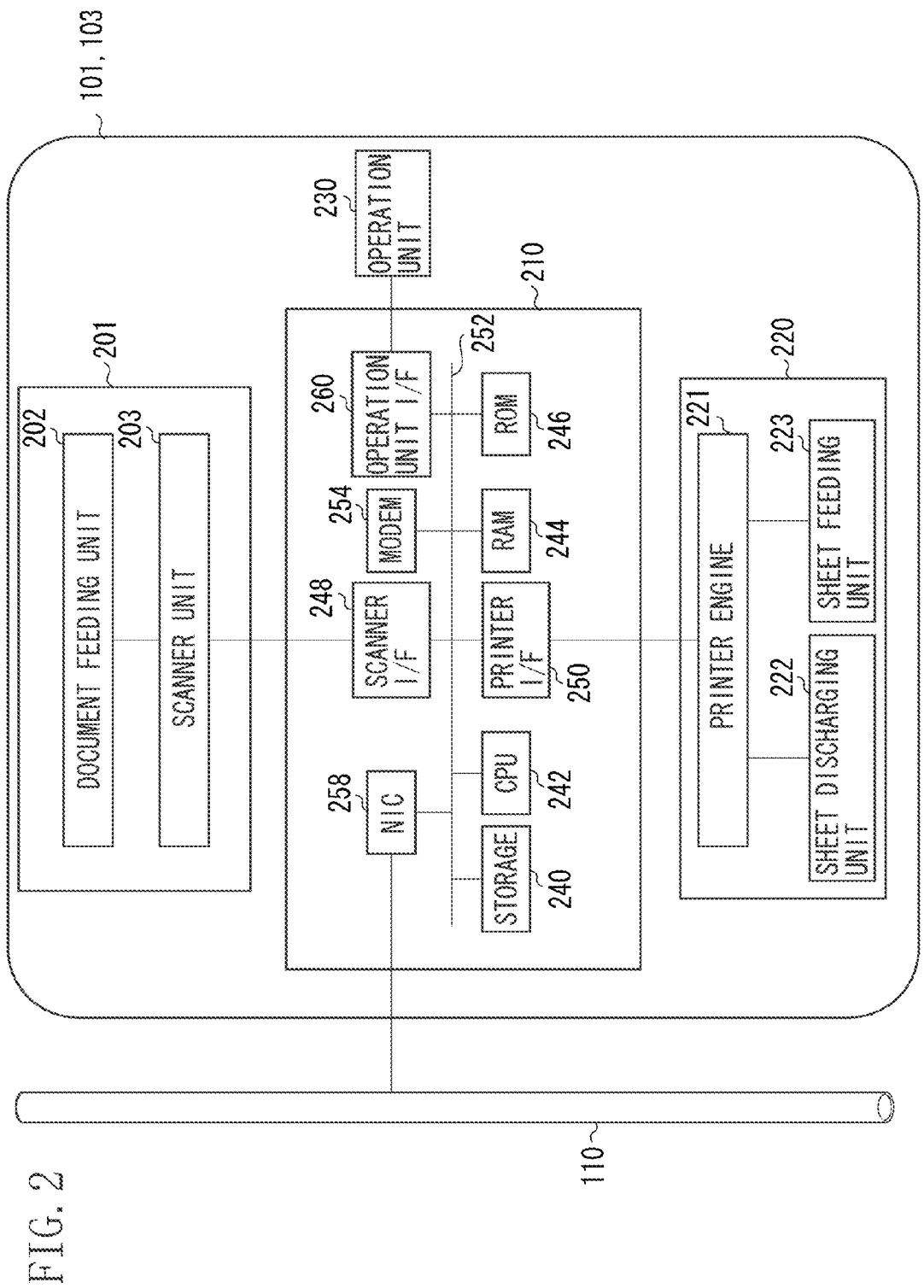
FIG. 2 illustrates an example of a hardware configuration of a multifunction peripheral according to the exemplary embodiment

FIG. 2 illustrates an example of a hardware configuration of each of the multifunction peripherals 101 and 103 according to the present exemplary embodiment.

A reader unit 201 optically reads a document image to generate electronic image data. The reader unit 201 includes a scanner unit 203 that has a function of reading a document, and a document feeding unit 202 that has a function of conveying the document to the scanner unit 203. Some device configurations may not include any document feeding unit 202. In such a case, a user places the document on a platen glass.

A printer unit 220 conveys recording paper to print image data as a visible image thereon. The printer unit 220 includes a sheet feeding unit 223 that has a plurality of types of recording paper cassettes, a printer engine 221 that transfers and fixes the image data on the recording paper, and a sheet discharging unit 222 that has a function of sorting or stapling the printed recording paper. The multifunction peripherals 101 and 103 can optionally include sheet discharging units.

A control apparatus 210 is in overall control of the multifunction peripheral 101. A storage 240, a central processing unit (CPU) 242, a random access memory (RAM) 244, a read-only memory (ROM) 246, a scanner interface (I/F) 248, a printer interface (I/F) 250, and a modem 254 are connected to an internal bus 252 of the control apparatus 210.

The CPU 242 executes a program stored in the ROM 246 or the storage 240 to control the multifunction peripheral 101. The RAM 244 provides a work area for the CPU 242. The ROM 246 stores the program executed by the CPU 242. The storage 240 stores the program executed by the CPU 242, image data, and a script described below. In the present exemplary embodiment, a hard disk (HDD) is used for the storage 240. However, a solid state drive (SSD) can be used.

The scanner I/F 248 is an interface with the scanner unit 203. The printer I/F 250 is an interface with the printer engine 221. The modem 254 enables the multifunction peripheral 101 to perform facsimile transmission/reception, and modulates and transmits the image data to a public line (not shown) or demodulates data received from the public line. In the present exemplary embodiment, the multifunction peripheral 101 optionally includes a facsimile function. The modem 254 is connected to the bus 252 so that the facsimile function can be used. A network interface (NIC) 258 is an interface with the LAN 110. An operation unit interface (I/F) 260 is an interface with an operation unit 230.

The control apparatus 210 controls the reader unit 201 to read a document and generate image data, and controls the printer unit 220 to print the image data on a recording sheet, so that a copy function of the multifunction peripheral 101 can be provided. The control apparatus 210 provides a network scanner function of converting the image data generated by the reader unit 201 into code data and transmitting the code data to a host computer via the LAN 110. The control apparatus 210 provides a box scan function of registering the image data generated by the reader unit 201 in a storage area (box) formed in the storage 240 to provide a storage service. The control apparatus 210 provides a box print function of printing and outputting the image data stored in the box by the printer unit 220. The control apparatus 210 further provides a printer function of converting code data such as data of a page description language (PDL) received from the client machine 102 via the LAN 110 into image data to output the image data to the printer unit 220.

The operation unit 230 provides a user interface (user I/F) that enables the user to perform various operations. The operation unit 230 includes a liquid crystal display unit, a touch panel input device stuck on the liquid crystal display unit, and a plurality of hard keys. The liquid crystal display unit displays an operation screen of the multifunction peripheral 101. The touch panel input device and the hard keys receive user's operation inputs. A signal input by the touch panel input device or the hard keys is transmitted to the control apparatus 210 via the operation unit I/F 260. The liquid crystal display unit displays display data transmitted from the control apparatus 210.

Figure 3:
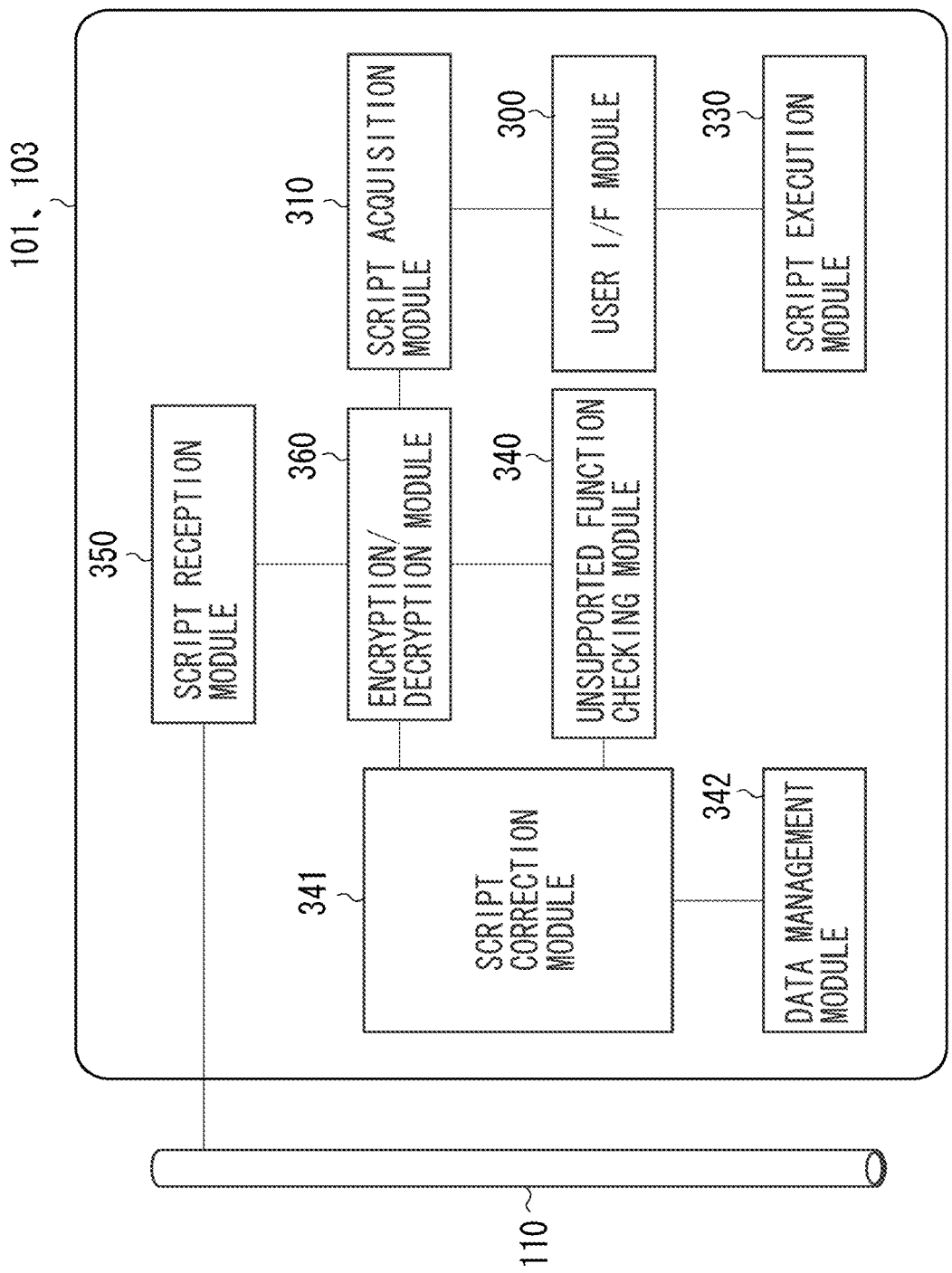
FIG. 3 illustrates an example of a software configuration of the multifunction peripheral according to the exemplary embodiment.

FIG. 3 illustrates an example of a software configuration of each of the multifunction peripherals 101 and 103 according to the present exemplary embodiment. Each module software (program) illustrated in FIG. 3 is stored in the storage 240. The software is read to the RAM 244 to be executed by the CPU 242.

A user I/F module 300 displays the operation screen on the operation unit 230, and receives a user's instruction via the operation unit 230. In the present exemplary embodiment, the user I/F module 300 receives an instruction to display a list of scripts stored in the storage 240 on the operation unit 230 or an instruction to execute the script. The user I/F module 300 receives a display instruction to display a definition content of a designated script on the operation unit 230 to edit the script.

A script acquisition module 310 reads information indicating the list of scripts from the storage 240 according to the instruction received by the user I/F module 300, temporarily stores the information in the RAM 244, and displays the list of scripts on the operation unit 230. In this case, if the scripts stored in the storage 240 have been encrypted, an encryption/decryption module 360 decrypts the scripts to store them in the RAM 244.

A script execution module 330 calls a function as defined in the decrypted script data stored in the RAM 244 according to the execution instruction received by the user I/F module 300, and causes the multifunction peripheral 101 to execute a job. An unsupported function checking module 340 checks, when the script is executed or edited, whether description of the script includes a job type, a function, a setting item, or a setting value which is inexecutable in the multifunction peripheral 101 that executes the script.

A script correction module 341 corrects, when necessary, the description of the script detected by the unsupported function checking module 340 and temporarily stores the corrected data in the RAM 244. A script reception module 350 receives a script from the multifunction peripheral 103 or the client machine 102 connected to the LAN 110, and stores the received script in the storage 240.

A data management module 342 classifies a job type, a function, a setting item, and a setting value constituting a script under correction methods to manage them. The script correction module 341 corrects the job type, the function, the setting item, and the setting value described in the script according to the correction methods managed by the data management module 342.

Figure 4:
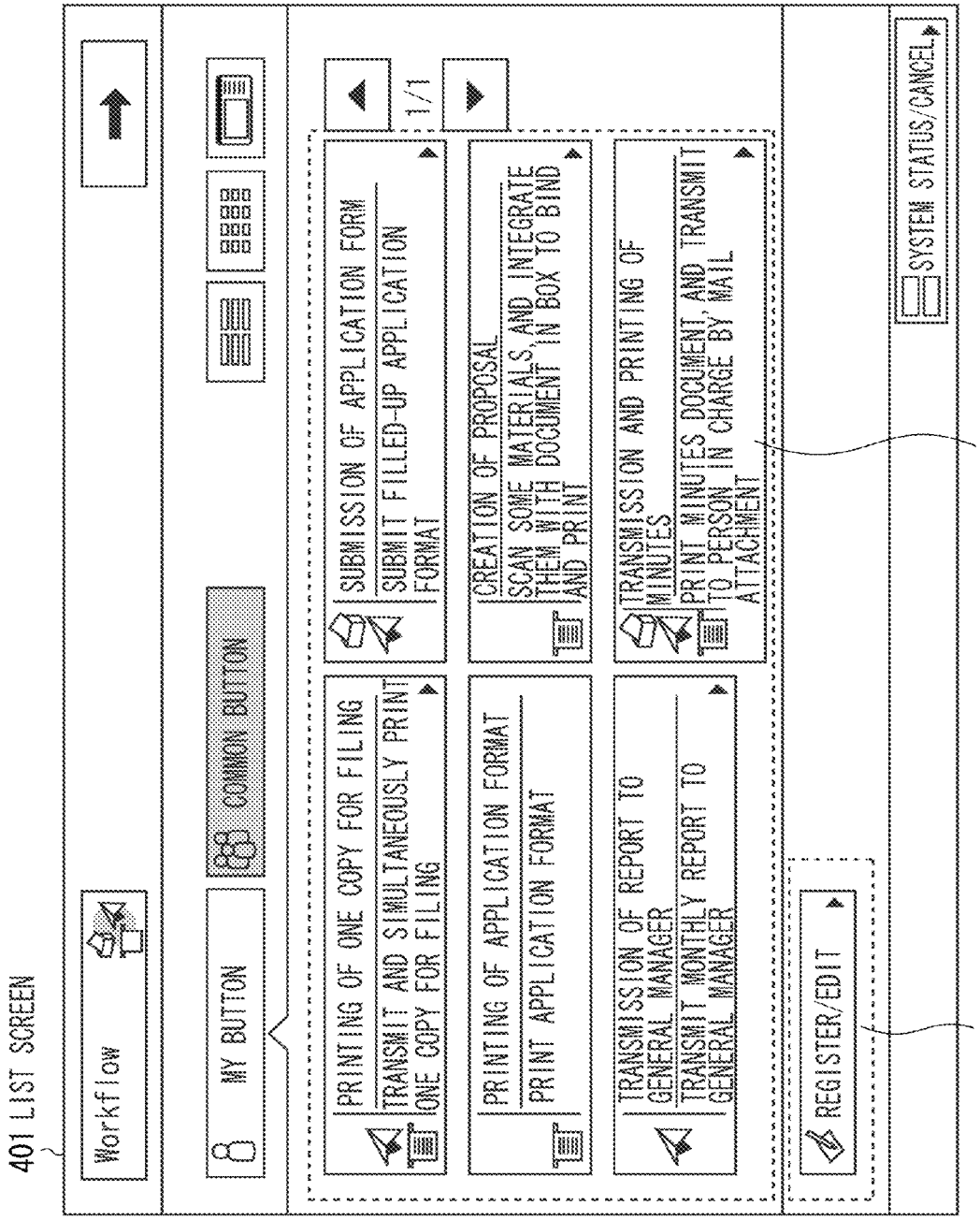
FIG. 4 illustrates an example of an operation screen to be displayed on an operation unit by a user interface module.

FIG. 4 illustrates an example of an operation screen displayed on the operation unit 230 by the user I/F module 300.

The operation unit 230 displays the list of scripts stored in the multifunction peripheral 101 as a list screen 401. For one registered script, one corresponding script calling button 402 is displayed.

When a user presses the calling button, the user I/F module 300 receives the pressing as a script execution instruction. When the mode is switched to an edit mode by an edit mode switching button 403, the user presses the script calling button 402 to display a content of the script on the operation unit, so that the script becomes an editable state.

FIG. 6 illustrates an example of a script according to the present exemplary embodiment. In the present exemplary embodiment, the script is described in extended markup language (XML).

A job type 601 includes a job type and an execution sequence as attribute values. The job type defines a type of a job executed in the multifunction peripheral 101 such as copying, box scanning, box printing, or facsimile transmission. The execution sequence defines a sequence of executing a plurality of jobs.

A function name 602 includes a function name as an attribute value. The function name identifies various functions necessary when each job is executed. For example, functions necessary for a box scan job include a document reading mode, a density, a read size, and a magnification. Functions necessary for a box print job include a recording paper size, the number of copies, and a finishing function such as stapling. Functions necessary for a transmission job include a transmission file name, a transmission file format such as a tag image file format (TIFF)/portable document format (PDF), and an address of a transmission destination.

A setting item name 603 includes a setting item name as an attribute value. The setting item name identifies a setting item constituting each function. For example, setting items constituting a function of a magnification include an X-direction magnification and a Y-direction magnification. For the setting item name 603, a setting value 604 is defined as a value for each setting item. For example, as a setting value for the X-direction magnification, a numerical value such as 100(%) is defined.

In the present exemplary embodiment, a script includes in combination the job type 601, the function name 602, the setting item name 603, and the setting value 604. The setting item has one setting value. A function includes at least one setting item. A job includes at least one function. The script includes at least one job type.

The script execution module interprets a description content of the script similar to that illustrated in FIG. 6, and executes functions described in the script in execution order described in the script.

Figure 5:
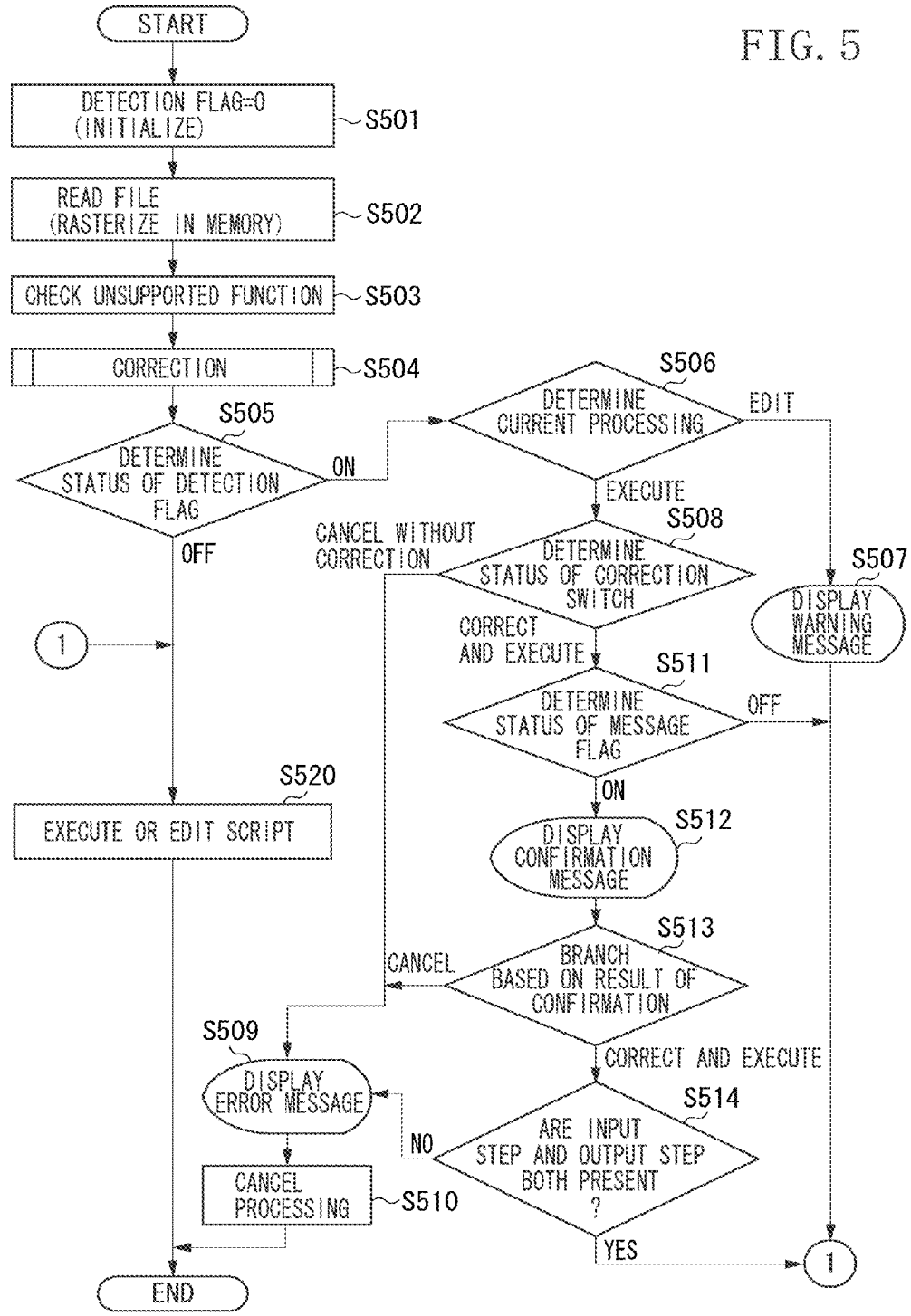
FIG. 5 is a flowchart illustrating an example of processing when the multifunction peripheral executes or edits a script.

FIG. 5 is a flowchart illustrating an example of processing when the multifunction peripheral executes or edits the script according to the present exemplary embodiment. The CPU 242 of the multifunction peripheral 101 executes the processing illustrated in the flowchart. The CPU 242 starts execution of the processing in the flowchart in a state where the operation unit 230 displays a script list screen illustrated in FIG. 4.

In step S501, the CPU 242 initializes a detection flag. The detection flag indicates that the unsupported function checking module 340 has detected one of the job type 601, the function name 602, the setting item 603, and the setting value 604 inexecutable by the multifunction peripheral 101. In step S501, the CPU 242 sets the detection flag to non-detection (OFF). The detection flag is located in a predetermined area in the RAM 244.

In step S502, the CPU 242 temporarily stores, in the RAM 244, the script which is designated according to a script execution instruction or a script editing instruction received by the user I/F module 300.

In step S503, the unsupported function checking module 340 checks whether any one of the job type 601, the function name 602, the setting item name 603, and the setting value 604 in the script stored in the RAM 244 is inexecutable (hereinafter, unsupported element) by the multifunction peripheral 101. More specifically, the unsupported function checking module 340 collates the job type 601, the function name 602, the setting item name 603, and the setting value 604 in the script with the functions included in the multifunction peripheral 101, and determines whether each element can be executed by the multifunction peripheral 101. When an unsupported element is detected, the CPU 242 sets the detection flag in a detection state (ON).

In step S504, the script correction module 341 corrects the unsupported element detected in step S503, and temporarily stores the corrected script in the RAM 244. In the present exemplary embodiment, step S503 and step S504 are sequentially executed. More specifically, after processing in step S503 is executed for the plurality of scripts, processing in step S504 is executed. Alternatively, step S503 and step S504 can be executed by loops equal in number to scripts. For example, every time one script is corrected, an unsupported function is checked.

In step S505, the CPU 242 determines a status of the detection flag. When the detection flag is in an OFF state, the processing proceeds to step S520 to execute the script as defined in the script stored in the RAM 244, or displays the script on the operation unit 230 to set an editable state. When the detection flag is in an ON state, the processing proceeds to step S506.

In step S506, the CPU 242 determines which of script execution and script editing the current processing is. The processing proceeds to step S508 in the case of the script execution, and to step S507 in the case of the script editing.

In step S507, the CPU 242 displays a warning message on the operation unit 230 to notify the user of inclusion of the unsupported element in the script. The warning message can be inhibited to be displayed via the user I/F module 300 according to a user's instruction.

In step S508, the CPU 242 determines a status of a correction switch (SW) to determine cancellation of the script execution without correction or execution with correction. The correction SW can be registered beforehand in the RAM 244 according to a user's instruction from the operation unit or described beforehand in the script.

When the status of the correction SW is "cancel processing without correction", the processing proceeds to step S509. In step S509, the unsupported element is included in the script, and hence the CPU 242 displays an error message indicating that the processing cannot be continued on the operation unit 230. In step S510, the CPU 242 cancels the script execution. The CPU 242 then terminates the processing in the flowchart.

When the status of the correction SW is "correct and execute", the processing proceeds to step S511. In step S511, the CPU 242 determines a status of a message flag. The message flag indicates whether to notify the user of correction of a content of a script to be executed, more specifically, execution of a script different in content from a script generated by the user. The message flag can be registered beforehand in the RAM 244 by an instruction from the operation unit 230 or described beforehand in the script.

When the message flag is OFF, the CPU 242 corrects the script without displaying any confirmation message. The processing proceeds to step S520 to execute the corrected script. On the other hand, when the message flag is ON in step S511, the processing proceeds to step S512 to display a conformation message and prompt the user to confirm correction and execution of the script or cancellation of the script execution.

In step S513, the CPU 242 branches the processing according to a user's instruction received in step S512. When the user's instruction is "cancel processing", the processing proceeds to step S509 to display a message indicating processing cancellation on the operation unit 230. The processing then proceeds to step S510 to cancel the processing. When the user's instruction is "correct and execute", the processing proceeds to step S514.

In step S514, the CPU 242 checks whether the corrected script has a minimum necessary configuration as a script. The minimum necessary configuration means that the script includes an input step of the image data and an output step of the image data defined at least one each. The input step uses a function of document scanning or box document selection. The output step uses a function of transmission or printing.

When one of the input step and the output step is not present in the script (NO in step S514), the processing proceeds to step S509 and step S510 to cancel the processing. When the input step and the output step are both present, the script execution module 330 executes the script based on the corrected script temporarily stored in the RAM 244.

In the present exemplary embodiment, the unsupported function checking and the correction are completed in the first half of the processing. However, to notify the user earlier, the processing can proceed to step S506 when an unsupported function is first detected. In this case, the unsupported function checking and the correction are continued when the current processing is based on the script editing instruction. When the current processing is based on the script execution instruction, the unsupported function checking and the correction are continued only when there is a correction instruction from the user in step S513.

Next, the processing in step S504 illustrated in FIG. 5 will be described in detail. The script correction performed in step S504 includes four processes, i.e., correction of the job type 601 illustrated in FIG. 7, correction of the function name 602 illustrated in FIG. 8, correction of the setting item name 603 illustrated in FIG. 9, and correction of the setting value 604 illustrated in FIG. 10. In the present exemplary embodiment, the processes illustrated in FIGS. 7 to 10 are sequentially executed.

Figure 7:
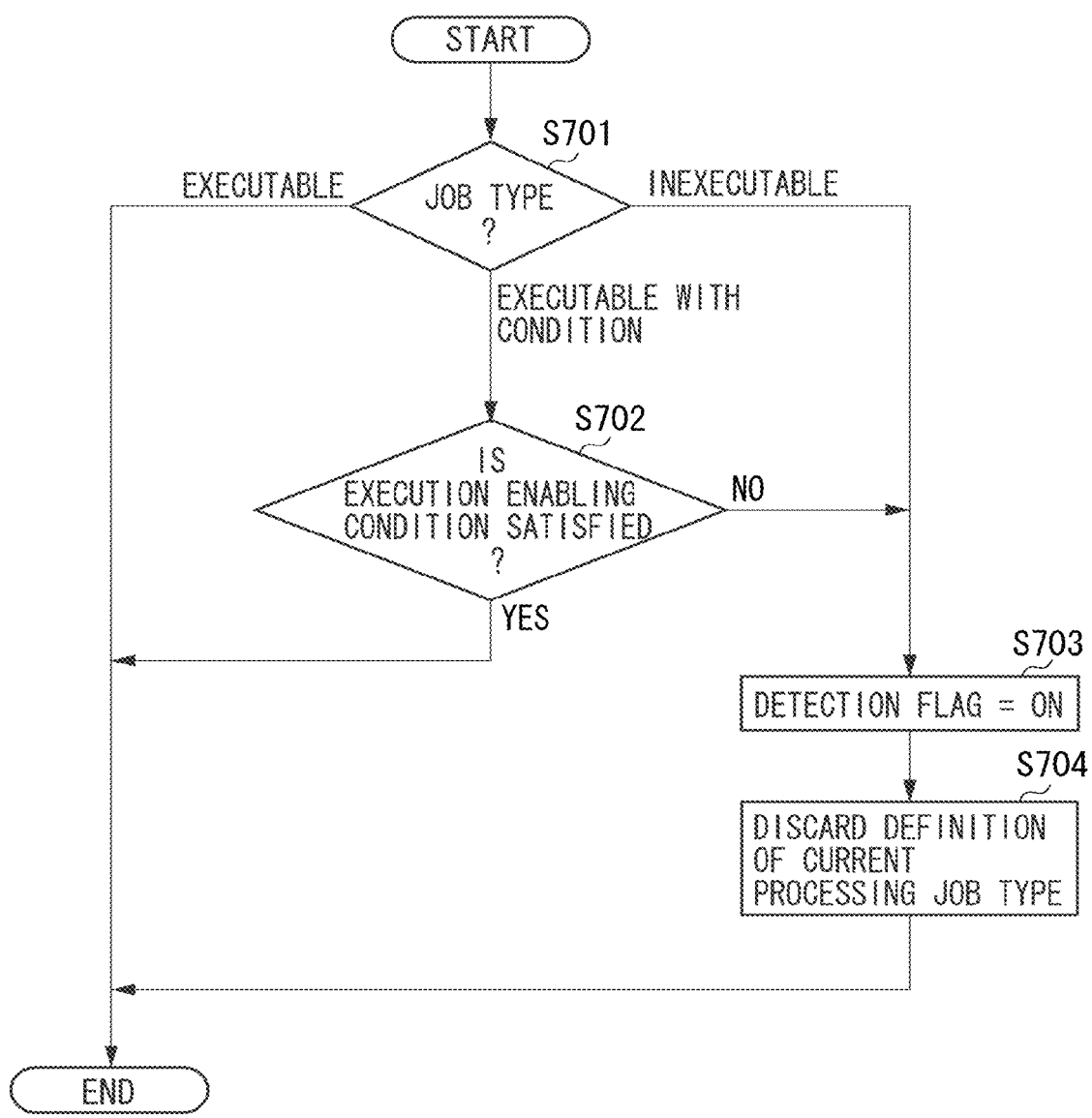
FIG. 7 is a flowchart illustrating an example of a procedure of processing for correcting description regarding a job type in a script.

FIG. 7 is a flowchart illustrating an example of correction of description regarding the job type in the script according to the present exemplary embodiment. The flowchart illustrates a part of the processing in step 504 illustrated in FIG. 5 which corrects the job type 601 in the script.

Classification of the job types managed by the data management module 342 is described. The data management module 342 classifies the job types 601 described in the scripts into "executable", "executable with condition", and "inexecutable".

A job classified as "executable" can be unconditionally executed (unconditionally supported) by the multifunction peripheral 101. The job classified as "executable" is executable by the multifunction peripheral 101 which is in a state at the time of factory shipment. No particular script correction is necessary.

A job classified as "executable with condition" can be executed with a condition (conditionally supported) by the multifunction peripheral 101. The condition means that an appropriate option is provided.

A job classified as "inexecutable" cannot be executed by the multifunction peripheral 101. The job classified as "inexecutable" cannot be executed no matter what options the multifunction peripheral 101 includes. When the "inexecutable" job is detected, the CPU 242 sets the detection flag to "detection" (ON).

In step S701, based on the checking result in step S503, the CPU 242 checks which type the job type 601 in the script stored in the RAM 244 is classified into by the data management module 342. When the job type 601 is determined to be "executable" in step S701, the processing in the flowchart illustrated in FIG. 7 is directly terminated. When the job type 601 is determined to be "executable with condition" in step S701, the processing proceeds to step S702.

In step S702, the CPU 242 checks a condition such as an option necessary for executing the current script by the multifunction peripheral 101. If the condition is satisfied (YES in step S702), the processing in the flowchart illustrated in FIG. 7 is directly terminated. If the condition is not satisfied (NO in step S702), the processing proceeds to step S703. When the job type 601 is determined to be "inexecutable" in step S701, the processing proceeds to step S703.

In step S703, the CPU 242 sets the detection flag to detection (ON). In step S704, the CPU 242 deletes the job type 601 included in the currently checked script from the script. The CPU 242 further deletes elements and values of the function name 602, the setting item name 603, and the setting value 604 related to the job type 601 from the script. For example, in the case of a job type of facsimile transmission, the CPU 242 checks presence of a hardware resource such as a modem, and deletes all definitions related to the facsimile transmission from script data if there are no hardware resources. The processing in the flowchart illustrated in FIG. 7 enables classification of the job types included in the script into three types, and deletion (or invalidation) of description regarding the inexecutable job type included in the script.

Figure 8:
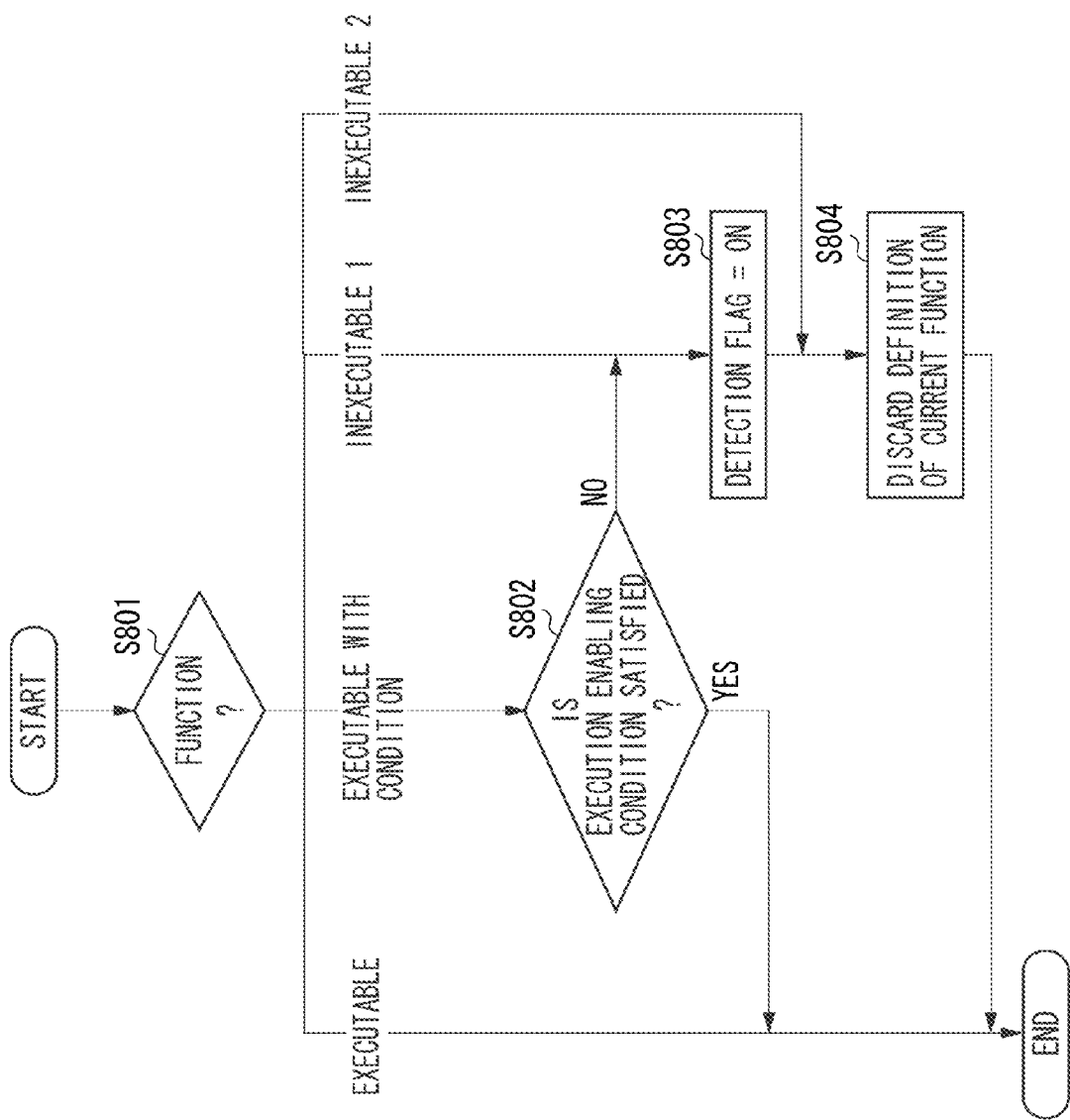
FIG. 8 is a flowchart illustrating an example of a procedure of processing for correcting description regarding a function name in a script.

FIG. 8 is a flowchart illustrating an example of a correction procedure of description regarding the function name in the script according to the present exemplary embodiment. The flowchart illustrates a part of the processing in step 504 illustrated in FIG. 5 which corrects the function name 602 in the script. Classification of function names managed by the data management module 342 is described. The data management module 342 classifies the function names 602 described in the scripts into "executable", "executable with condition", "inexecutable (1)", and "inexecutable (2)".

A function name classified as "executable" can be unconditionally executed (unconditionally supported) by the multifunction peripheral. The function name classified as "executable" is executable by the multifunction peripheral 101 which is in the state at the time of factory shipment. No particular script correction is necessary.

A function name classified as "executable with condition" can be executed with a condition (conditionally supported) by the multifunction peripheral 101. The condition means that an appropriate option is provided.

A function name classified as "inexecutable (1)" cannot be executed (not supported) by the multifunction peripheral 101. In the case of the function name classified as "inexecutable (1)", a job where the function name has been set cannot be executed no matter what options the multifunction peripheral 101 includes. When the function name classified as "inexecutable (1)" is detected, the CPU 242 sets the detection flag to "detection" (ON).

A function name classified as "inexecutable (2)" cannot be executed by the multifunction peripheral 101 as in the case of the function name classified as "inexecutable (1)". Different from the function name classified as "inexecutable (1)", however, the CPU 242 maintains the detection flag at "non-detection" (OFF) even when the function name inexecutable by the multifunction peripheral 101 is detected.

In the present exemplary embodiment, the data management module 342 finely classifies function names inexecutable by the multifunction peripheral 101 into "inexecutable (1)" and "inexecutable (2)". However, this classification is not essential.

In step S801, based on the checking result in step S503, the CPU 242 checks which type the function name 602 in the script stored in the RAM 244 is classified into by the data management module 342. When the function name 602 is classified as "executable" in step S701, the processing in the flowchart illustrated in FIG. 8 is directly terminated.

When the function name 602 is classified as "executable with condition" in step S801, the processing proceeds to step S802.

In step S802, the CPU 242 checks a condition such as an option necessary for executing the function name 602 by the multifunction peripheral 101. If the condition is satisfied (YES in step S802), the processing in the flowchart is directly terminated. If the condition is not satisfied (NO in step S802), the processing proceeds to step S803.

When the function name 602 is classified as "inexecutable (1)" in step S801, the processing proceeds to step S803.

In step S803, the CPU 242 sets the detection flag to "detection" (ON). The processing proceeds to step S804. The function name 602 cannot be executed by the multifunction peripheral 101, and hence the CPU 242 deletes the function name 602 from the script. The CPU 242 further deletes elements and values of the setting item name 603 and the setting value 604 related to the function name.

For example, it is assumed that a job type of box printing includes a function name of finishing to designate a processing method of a print product. In this case, the CPU 242 checks whether the multifunction peripheral 101 includes an option such as a finisher. If there is no such option, the CPU 242 deletes the setting item and the setting value related to the finishing function among definitions regarding a box print job from script data.

When the function name 602 is classified as "inexecutable (2)" in step S801, the processing proceeds to step S804. More specifically, while the script includes an unsupported element, the CPU 242 executes processing in step S804 without issuing any warning message.

For example, a color multifunction peripheral has, as a function name included in a job type such as copying or scanning, an image quality adjustment function that can designate adjustment values for R, G and B colors. However, a monochrome multifunction peripheral has no such function name, and hence the function name cannot be executed. When the monochrome multifunction peripheral executes a script which includes an image quality adjustment function defined in the script data, the image quality adjustment function can be classified as "inexecutable (1)" in step S801.

However, when the user selects the monochrome multifunction peripheral as a multifunction peripheral to execute the script, the user may be aware that the document is scanned black and white. If the user is notified of correction of the script in such a case, the user may rather be confused. Thus, classifying the image quality adjustment function as "inexecutable (2)" in such a case enables correction of description of the script without making any unnecessary notification to the user. After execution of processing in step S804, the processing in the flowchart is terminated.

Figure 9:
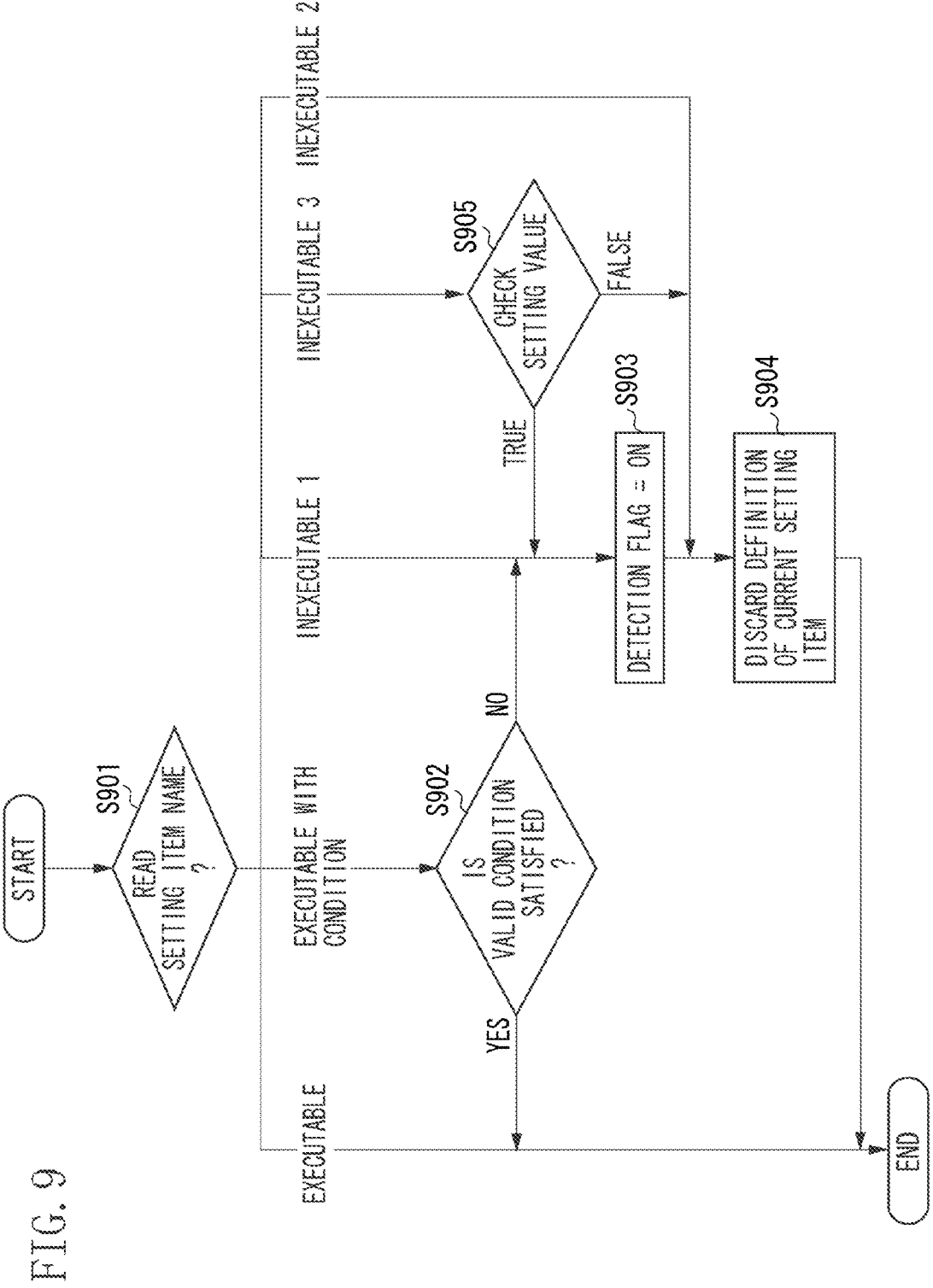
FIG. 9 is a flowchart illustrating an example of a procedure of processing for correcting description regarding a setting item name in a script.

FIG. 9 is a flowchart illustrating an example of a correction procedure of description regarding the setting item name in the script according to the present exemplary embodiment. The flowchart illustrates a part of the processing in step 504 illustrated in FIG. 5 which corrects the setting item name 603 in the script.

Classification of the setting item names managed by the data management module 342 is described. The data management module 342 classifies the setting item names 603 described in the scripts into "executable", "executable with condition", "inexecutable (1)", "inexecutable (2)", and "inexecutable (3)".

A setting item name classified as "executable" can be unconditionally executed (unconditionally supported) by the multifunction peripheral 101. The setting item name classified as "executable" is executable by the multifunction peripheral 101 which is in the state at the time of factory shipment. No particular script correction is necessary.

A setting item name classified as "executable with condition" can be executed with a condition (conditionally supported) by the multifunction peripheral 101. The condition means that an appropriate option is provided.

A setting item name classified as "inexecutable (1)" cannot be executed by the multifunction peripheral 101. In the case of the setting item name classified as "inexecutable (1)", a job having a function name in which the setting item name has been selected cannot be executed no matter what options the multifunction peripheral 101 includes. When the setting item name classified as "inexecutable (1)" is detected, the CPU 242 sets the detection flag to "detection" (ON).

A setting item name classified as "inexecutable (2)" cannot be executed by the multifunction peripheral 101 as in the case of the setting item name classified as "inexecutable (1)". Different from the setting item name classified as "inexecutable (1)", however, the CPU 242 maintains the detection flag at "non-detection" (OFF) even when the setting item name inexecutable by the multifunction peripheral 101 is detected.

A setting item name classified as "inexecutable (3)" cannot be executed by the multifunction peripheral 101 as in the case of the setting item name classified as "inexecutable (2)". The CPU 242 maintains the detection flag at "non-detection" (OFF) even when the setting item name inexecutable by the multifunction peripheral 101 is detected. Different from the setting item name classified as "inexecutable (2)", however, the setting item name classified as "inexecutable (3)" includes a boolean value as a setting value.

In step S901, based on the checking result in step S503, the CPU 242 checks which type the setting item name 603 described in the script stored in the RAM 244 is classified into by the data management module 342. When the setting item name 603 is classified as "executable" in step S901, the processing in the flowchart illustrated in FIG. 9 is directly terminated.

When the setting item name 603 is classified as "executable with condition" in step S901, the processing proceeds to step S902.

In step S902, the CPU 242 checks a condition such as an option necessary for executing the setting item name 603 by the multifunction peripheral 101. If the condition is satisfied (YES in step S902), the processing in the flowchart is terminated. If the condition is not satisfied (NO in step S902), the processing proceeds to step S903.

When the setting item name 602 is classified as "inexecutable (1)" in step S901, the processing proceeds to step S903. In step S903, the CPU 242 sets the detection flag to "detection" (ON). The processing proceeds to step S904. The setting item name 603 cannot be executed by the multifunction peripheral 101, thus the CPU 242 deletes the setting item name 603 from the script. The CPU 242 further deletes a setting value related to the setting item name.

When the setting item name 603 is classified as "inexecutable (2)" in step S901, the processing proceeds to step S904.

When the setting item name is classified as "inexecutable (3)", the processing proceeds to step S905. In step S905, the CPU 242 checks the setting value 604 included in the setting item name 603. The processing proceeds to step S903 when the setting value 604 is determined to be TRUE in step S905, and to step S904 when the setting value 604 is determined to be FALSE. More specifically, when the setting value 604 is true, the CPU 242 notifies the user of detection of the unsupported element, and issues no such notification when the setting value 604 is false.

The false setting value 604 included in the setting item name 603 means that the setting item name 603 is turned OFF (not used). Hence, correction of the script is unnecessary, and there is no need to warn the user.

Figure 10:
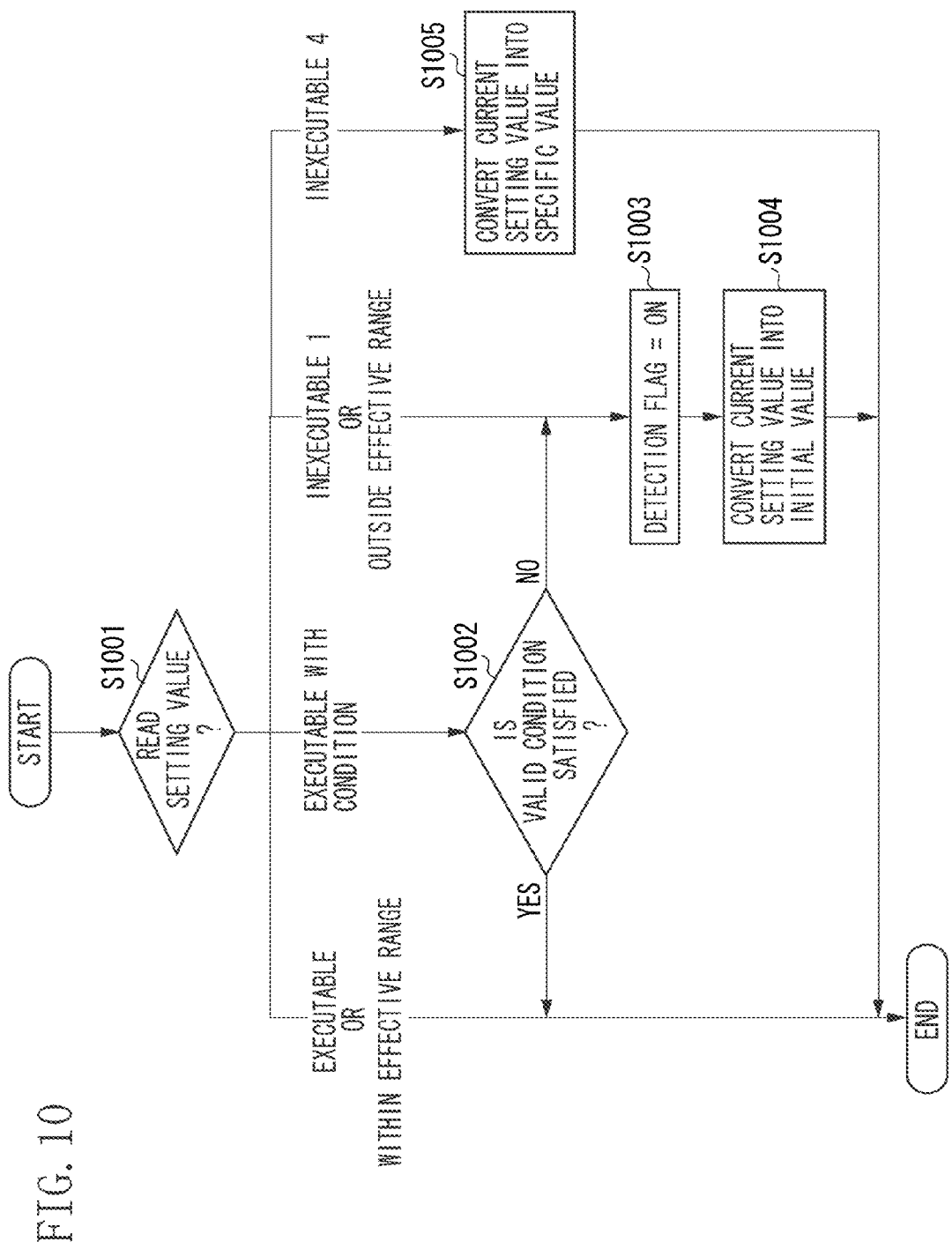
FIG. 10 is a flowchart illustrating an example of a procedure of processing for correcting a setting value in a script.

FIG. 10 is a flowchart illustrating an example of a correction procedure of the setting value 604 in the script according to the present exemplary embodiment. The flowchart illustrates a part of the processing in step 504 illustrated in FIG. 5 which corrects the setting value 604 in the script.

Classification of the setting values managed by the data management module 342 is described. The data management module 342 classifies the setting values 604 described in the scripts into "executable", "executable with condition", "inexecutable (1)", and "inexecutable (4)".

A setting value classified as "executable" can be unconditionally executed (unconditionally supported) by the multifunction peripheral. The setting value classified as "executable" is executable by the multifunction peripheral 101 which is in a state at the time of factory shipment. No particular script correction is necessary.

A setting value classified as "executable with condition" can be executed with a condition (conditionally supported) by the multifunction peripheral 101. The condition means that an appropriate option is provided.

A setting value classified as "inexecutable (1)" cannot be executed (not supported) by the multifunction peripheral 101. In the case of the setting value classified as "inexecutable (1)", a job where the setting value has been set cannot be executed no matter what options the multifunction peripheral 101 includes. When the setting value classified as "inexecutable (1)" is detected, the CPU 242 sets the detection flag to "detection" (ON).

A setting value classified as "inexecutable (4)" cannot be executed by the multifunction peripheral 101 as in the case of the setting value classified as "inexecutable (1)". Different from the setting value classified as "inexecutable (1)", however, the CPU 242 maintains the detection flag at "non-detection" (OFF) even when the setting value inexecutable by the multifunction peripheral 101 is detected. When the setting value classified as "inexecutable (4)" is detected, the CPU 242 converts the setting value into a predetermined setting value.

In step S1001, based on the checking result in step S503, the CPU 242 checks which type the setting value 604 in the script stored in the RAM 244 is classified into by the data management module 342. When the setting value 604 is classified as "executable" in step S1001, the processing in the flowchart illustrated in FIG. 10 is directly terminated.

When the setting value 604 is classified as "executable with condition" in step S1001, the processing proceeds to step S1002. In step S1002, the CPU 242 checks a condition such as an option necessary for executing the setting value 604 by the multifunction peripheral 101. If the condition is satisfied (YES in step S1002), the processing in the flowchart is terminated. If the condition is not satisfied (NO in step S1002), the processing proceeds to step S1003.

When the setting value 604 is classified as "inexecutable (1)" in step S1001, the processing proceeds to step S1003. In step S1003, the CPU 242 sets the detection flag to "detection" (ON). Then, the processing proceeds to step S1004.

In step S1004, the CPU 242 converts (corrects) the setting value 604 into an initial value supported by the multifunction peripheral 101 in its factory shipment state.

If the setting value 604 is a numerical value having an effective range, in step S1001, the CPU 242 checks whether the numerical value is within the effective range. The processing proceeds to step S1003 when the numerical value is outside the effective range. When the numerical value is within the effective range, it is determined that the setting value 604 is executable, the CPU 242 terminates the processing in the flowchart.

When the setting value 604 is classified as "inexecutable (4)" in step S1001, the processing proceeds to step S1005. In step S1005, the CPU 242 converts the setting value 604 into a predetermined specific value. The CPU 242 then terminates the processing in the flowchart.

Step S1005 is different from step S1004 in that the setting value 604 is not always converted into an initial value of the multifunction peripheral 101. When the setting value 604 is classified as "inexecutable (4)", the CPU 242 maintains the defection flag at "non-detection".

For example, the color multifunction peripheral has a function name and a setting item name of a color mode when a document is scanned. As a setting value, a setting value of automatic color selection where the color mode is automatically switched, or a setting value of full-color scanning or monochrome scanning that explicitly designates the color mode is supported.

On the other hand, the monochrome multifunction peripheral supports only monochrome scanning. When a script of automatic color selection generated by the color multifunction peripheral is executed in the monochrome multifunction peripheral, the user may be aware that the script is always subjected to monochrome scanning, and hence displaying of a correction warning message or cancellation of processing leads to lack of convenience. In such a case, therefore, the script is classified as "inexecutable (4)", and correction is executed without any notification to the user.

According to the flowcharts of FIGS. 7 to 10, the job type 601, the function name 602, the setting item name 603, and the setting value 604 described in the script are classified into executable, executable with a condition, or inexecutable by the multifunction peripheral 101. Based on a result of the classification, the script can be corrected or a confirmation message can be displayed for the user. In addition, when the script is corrected, selective control of notifying/not notifying the user of correction of the script can be appropriately executed.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-239401 filed Oct. 16, 2009, which is hereby incorporated by reference herein in its entirety.

What is claimed is:

1. An image processing apparatus capable of processing an image based on a script indicating an execution content of a job, the image processing apparatus comprising:
    an execution unit configured to process the script;
    a classification unit configured to classify the script processed by the execution unit into a plurality of types including an executable type or an inexecutable type;
    a correction unit configured to correct a content of the script;
    a notification unit configured to notify a user of the image processing apparatus of the inexecutable type script by the execution unit; and
    a determination unit configured, when the classification unit classifies the script as the inexecutable type, to determine when to (a) perform notification by the notification unit or to (b) cause the correction unit to correct the content of the script without notification by the notification unit and to process the corrected script by the execution unit based on the content of the script and a function included in the image processing apparatus.

2. The image processing apparatus according to claim 1, wherein when a first function included in the content of the script is inexecutable by the image processing apparatus and the script includes information indicating non-use of the first function, the correction unit corrects the script to invalidate a content regarding the first function, and
    the determination unit determines to cause the correction unit to correct the content of the script without notification by the notification unit and to process the corrected script by the execution unit.

3. The image processing apparatus according to claim 1, wherein the image processing apparatus is capable of executing a plurality of types of jobs, and the script includes information indicating the type of the job, information indicating a setting item of the job, and a setting value regarding the setting item of the job, and
    wherein the classification unit classifies the script by collating the information indicating the type of the job, the information indicating the setting item, and the setting value with the function included in the image processing apparatus.

4. The image processing apparatus according to claim 3, wherein when the determination unit determines to (b) cause the correction unit to correct the content of the script without notification by the notification unit and to process the corrected script by the execution unit, the correction unit corrects the setting value included in the script to a predetermined value or to an initial value of the image processing apparatus.

5. A method for correcting a script executed by an image processing apparatus that includes an execution unit configured to process an image based on a script describing an execution content of a job, the method comprising:
    classifying the script processed by the execution unit into a plurality of types including an executable type or an inexecutable type by the execution unit;
    correcting the a content of the script;
    notifying a user of the image processing apparatus of the inexecutable type script by the execution unit; and
    determining, when the script is classified as the inexecutable type, when to (a) notify the user of the image processing apparatus of the inexecutable type script or to (b) correct the content of the script without notification and to process the corrected script by the execution unit based on the content of the script and a function included in the image processing apparatus.

6. A computer-readable storage medium storing a computer-executable instructions for executing a method for correcting a script executed by an image processing apparatus that includes an execution unit configured to process an image based on a script describing an execution content of a job, the method comprising:
    classifying the script processed by the execution unit into a plurality of types including an executable type or an inexecutable type by the execution unit;
    correcting a content of the script;
    notifying a user of the image processing apparatus of the inexecutable type script by the execution unit; and
    determining, when the script is classified as the inexecutable type, to (a) notify the user of the image processing apparatus of the inexecutable type script or (b) to correct the content of the script without notification and to process the corrected script by the execution unit based on the content of the script and a function included in the image processing apparatus.

* * * * *